United States Patent
Pantos et al.

(10) Patent No.: US 10,715,776 B2
(45) Date of Patent: Jul. 14, 2020

(54) PACKED I-FRAMES

(71) Applicant: Apple Inc., Cupertino, CA (US)

(72) Inventors: Roger N. Pantos, Cupertino, CA (US); Zhenheng Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 15/628,073

(22) Filed: Jun. 20, 2017

(65) Prior Publication Data

US 2017/0289514 A1    Oct. 5, 2017

Related U.S. Application Data

(63) Continuation of application No. 14/501,941, filed on Sep. 30, 2014.

(Continued)

(51) Int. Cl.
*H04N 9/804* (2006.01)
*G11B 27/00* (2006.01)
(Continued)

(52) U.S. Cl.
CPC ......... *H04N 9/8042* (2013.01); *G11B 27/005* (2013.01); *H04L 65/4084* (2013.01);
(Continued)

(58) Field of Classification Search
CPC ........... H04N 9/8042; H04N 21/23439; H04N 21/2387; H04N 21/6587; H04N 21/8455;
(Continued)

(56) References Cited

U.S. PATENT DOCUMENTS

| 6,057,832 A | 5/2000 | Lev et al. |
| 6,122,433 A | 9/2000 | McLauren |

(Continued)

FOREIGN PATENT DOCUMENTS

| WO | 2005/050999 A1 | 6/2005 |
| WO | 2011/059272 A2 | 5/2011 |
| WO | 2011/100727 A1 | 8/2011 |

OTHER PUBLICATIONS

International Search Report and Written Opinion, dated Sep. 1, 2015, from corresponding International Application No. PCT/US2015/032039, filed May 21, 2015.

(Continued)

*Primary Examiner* — Thai Q Tran
*Assistant Examiner* — Sunghyoun Park
(74) *Attorney, Agent, or Firm* — BakerHostetler

(57) ABSTRACT

Systems and methods for enabling playback control functions of a media player are disclosed. For example, a user of a client device receiving streaming playback of a video stream may perform rewind and fast forward control functions. The client device may implement these playback control functions by retrieving an enhanced playback segment. Using the enhanced playback segment, the media player may display selected frames at a predetermined interval while maintaining a visual cadence that is pleasing to a viewer. In the described embodiments, a client device may render a video stream, receive a command to control a fast forward or rewind playback mode for the video stream, and retrieve, from a distribution server or associated edge cache, one or more enhanced playback segments adapted to implement the user command.

19 Claims, 6 Drawing Sheets

Related U.S. Application Data

(60) Provisional application No. 62/005,803, filed on May 30, 2014.

(51) Int. Cl.
  *H04L 29/06* (2006.01)
  *H04N 21/2343* (2011.01)
  *H04N 21/2387* (2011.01)
  *H04N 21/6587* (2011.01)
  *H04N 21/845* (2011.01)
  *H04N 21/8543* (2011.01)

(52) U.S. Cl.
  CPC ........ *H04L 65/4092* (2013.01); *H04L 65/604* (2013.01); *H04L 65/607* (2013.01); *H04N 21/2387* (2013.01); *H04N 21/23439* (2013.01); *H04N 21/6587* (2013.01); *H04N 21/8455* (2013.01); *H04N 21/8456* (2013.01); *H04N 21/8543* (2013.01)

(58) Field of Classification Search
  CPC ........... H04N 21/8456; H04N 21/8543; G11B 27/005; H04L 65/4084; H04L 65/4092; H04L 65/604; H04L 65/607
  See application file for complete search history.

(56) References Cited

U.S. PATENT DOCUMENTS

| | | | |
|---|---|---|---|
| 7,106,798 B1 | 9/2006 | Fries et al. | |
| 7,937,735 B2* | 5/2011 | Avison | H04N 7/17336 386/232 |
| 8,407,747 B1 | 3/2013 | Inskip et al. | |
| 8,649,669 B2 | 2/2014 | Braness et al. | |
| 8,826,346 B1 | 9/2014 | Panje et al. | |
| 2002/0112247 A1 | 8/2002 | Homer et al. | |
| 2003/0099457 A1 | 5/2003 | Takahashi et al. | |
| 2005/0155072 A1 | 7/2005 | Kaczowka et al. | |
| 2005/0185923 A1 | 8/2005 | Tsurui et al. | |
| 2006/0078294 A1 | 4/2006 | Haruki | |
| 2007/0043875 A1* | 2/2007 | Brannon, Jr. | H04N 21/23608 709/231 |
| 2007/0058926 A1 | 3/2007 | Virdi et al. | |
| 2008/0317246 A1 | 12/2008 | Manders et al. | |
| 2009/0100496 A1 | 4/2009 | Bechtolsheim et al. | |
| 2010/0235528 A1* | 9/2010 | Bocharov | H04N 21/6437 709/231 |
| 2011/0119394 A1* | 5/2011 | Wang | H04N 21/23439 709/231 |
| 2011/0185058 A1* | 7/2011 | Priddle | H04N 5/783 709/224 |
| 2012/0030723 A1* | 2/2012 | Baum | H04N 21/234327 725/105 |
| 2012/0042090 A1 | 2/2012 | Chen et al. | |
| 2012/0210216 A1 | 8/2012 | Hurst | |
| 2012/0251086 A1 | 10/2012 | Cook | |
| 2013/0156321 A1* | 6/2013 | Motoi | G06T 7/0097 382/190 |
| 2013/0185756 A1 | 7/2013 | Frojdh et al. | |
| 2013/0239145 A1* | 9/2013 | Broome | G06Q 50/01 725/41 |
| 2013/0246643 A1* | 9/2013 | Luby | H04N 21/23439 709/231 |
| 2014/0109156 A1 | 4/2014 | Zhang | |
| 2014/0230003 A1* | 8/2014 | Ma | H04N 21/47217 725/115 |
| 2014/0280688 A1* | 9/2014 | Mao | H04L 67/2847 709/214 |
| 2014/0282760 A1 | 9/2014 | Panje et al. | |
| 2014/0359680 A1 | 12/2014 | Shivadas et al. | |
| 2015/0180924 A1* | 6/2015 | O'Callaghan | H04L 65/605 709/219 |
| 2016/0029076 A1* | 1/2016 | Huber | H04L 65/4076 725/32 |
| 2016/0057192 A1* | 2/2016 | Delaunay | H04L 65/605 709/219 |
| 2016/0142750 A1* | 5/2016 | Huber | H04L 65/605 725/116 |

OTHER PUBLICATIONS

International Preliminary Report on Patentability, dated Dec. 15, 2016, from corresponding International Application No. PCT/US2015/032039, filed May 21, 2015.

* cited by examiner

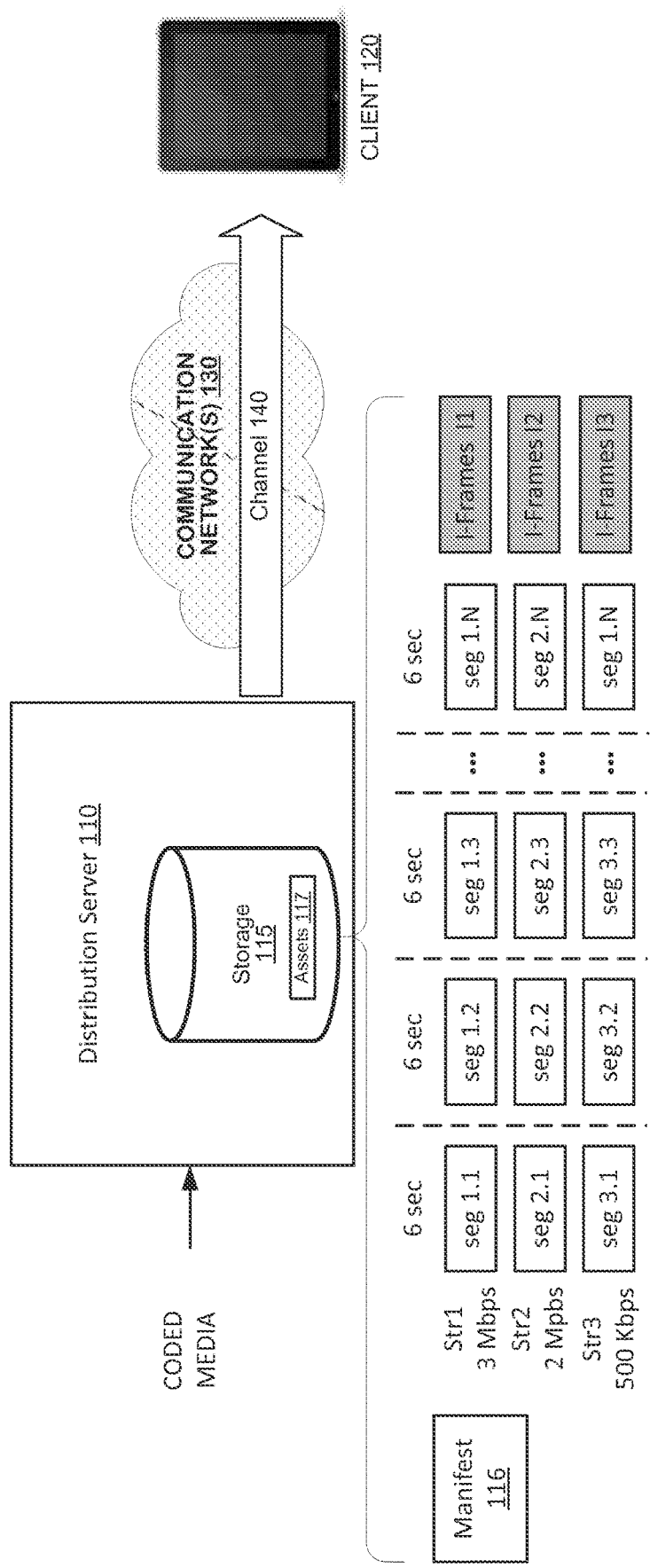

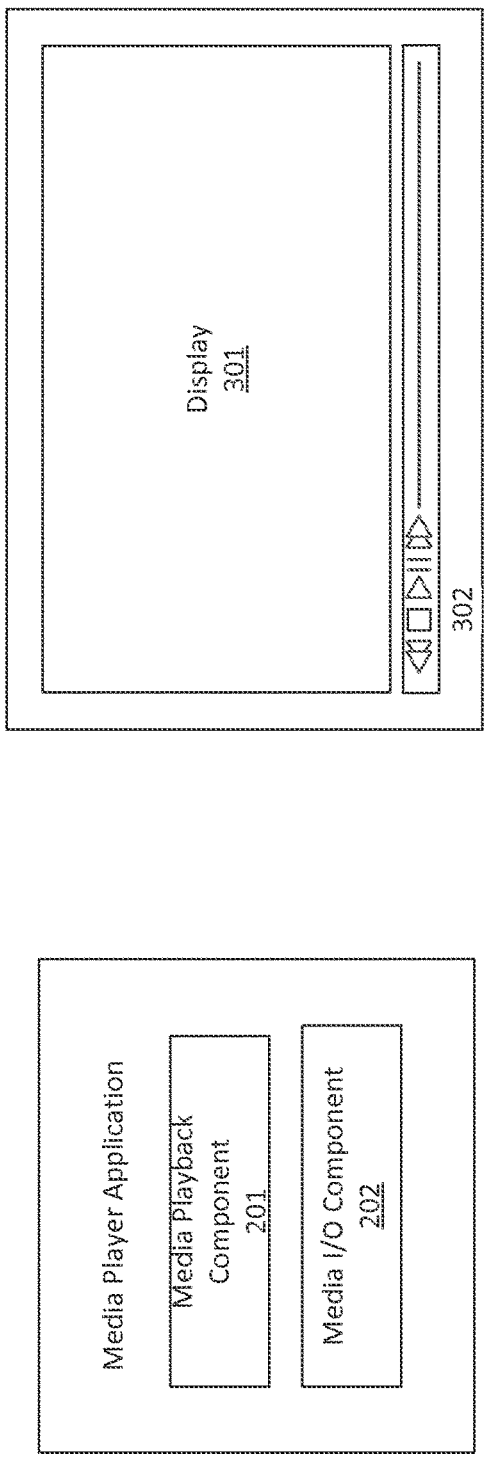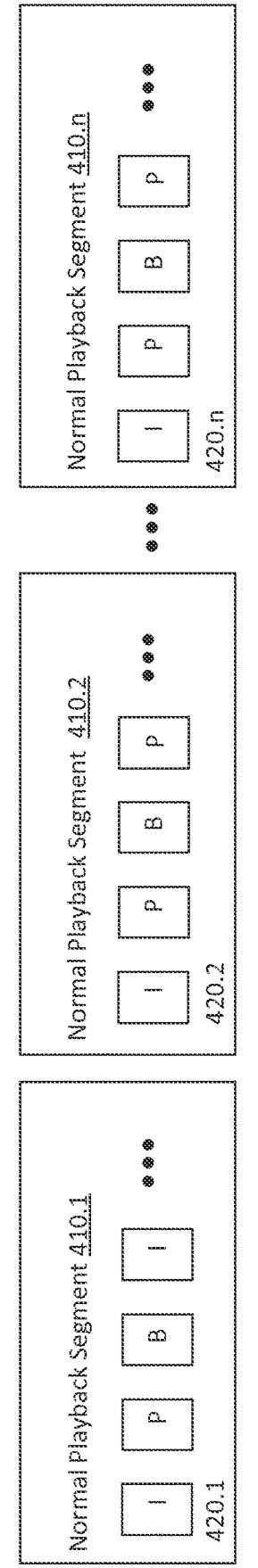

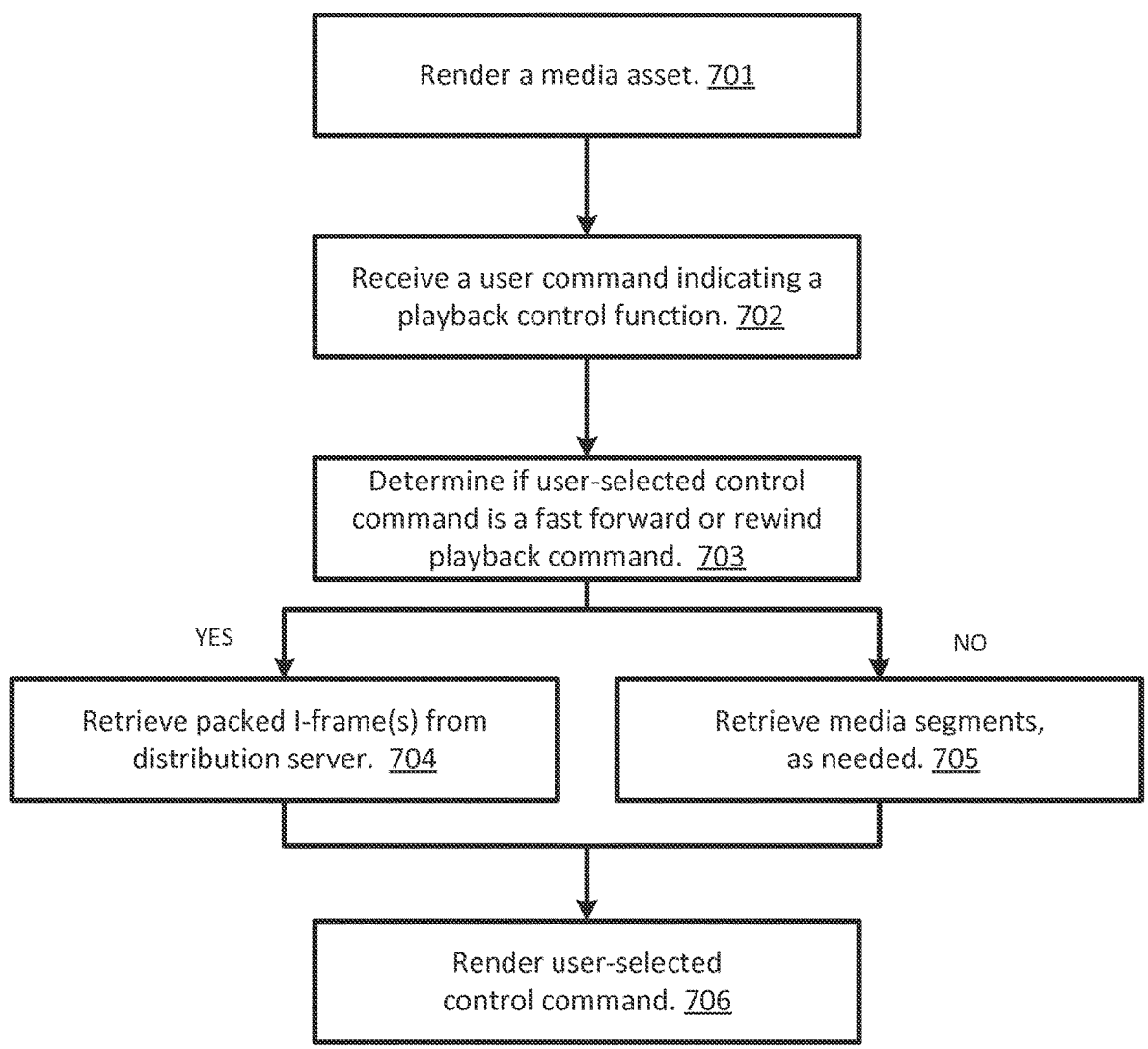

PACKED I-FRAMES

CROSS-REFERENCE TO RELATED APPLICATIONS

This application is a continuation of U.S. patent application Ser. No. 14/501,941, filed Sep. 30, 2014, which claims priority to U.S. Provisional Application Ser. No. 62/005,803, filed May 30, 2014, the contents of which are referenced herein in their entirety.

BACKGROUND

The present invention generally relates to streaming digital media and, in particular, to the organization of coded video data among transmission segments to support enhanced playback functions for streaming media.

Streaming digital media from a remote server to a client device over a communication network is an increasingly popular way for retrieving and viewing various digital media, which may include audio and video streams. Within a media player, users are accustomed to traditional playback control functions, such as rewind and fast forward. To implement these playback control functions for digital media, I-frames are selected at predetermined intervals depending on the fast forward or rewind speed.

However, implementing playback control functions for streaming digital media presents difficulties that are not encountered for their locally-stored counterparts. For example, when implementing fast forward functions, upcoming frames may not yet be stored at a client device. As a result, the client device must retrieve frames from the remote server as part of the streaming operation. The I-frames used for fast forward and rewind functions are intermixed with too many frames of other types to be downloaded efficiently. In addition, characteristics of typical network connections can present further difficulties in retrieving these frames in a manner compatible with achieving desirable qualities of the control functions. For example, it is typically desirable to perform rewind and fast forward functions by displaying frames selected at a predetermined interval in order to achieve a visual cadence that is pleasing to a viewer (e.g., not too choppy). However, retrieving frames over a communications network often involves variable and unpredictable transmission. Such variability and unpredictability has, thus far, caused processes dependent upon those retrieved frames, such as the implementation of playback control functions, to be unreliable.

In light of the drawbacks discussed above, the inventors have developed improved systems and methods for implementing playback control functions for streaming media.

BRIEF DESCRIPTION OF THE DRAWINGS

FIG. 1 is a simplified block diagram of an example media distribution system suitable for use with the present invention.

FIG. 2 illustrates example media player application hosted on a client device according to an example embodiment.

FIG. 3 illustrates a simplified user interface of a media player that implements media stream playback control functions according to an example embodiment.

FIG. 4 illustrates a video stream suitable for use with the present invention.

FIG. 7 illustrates a method for implementing a playback control function according to an example embodiment.

DETAILED DESCRIPTION

Figure 5:
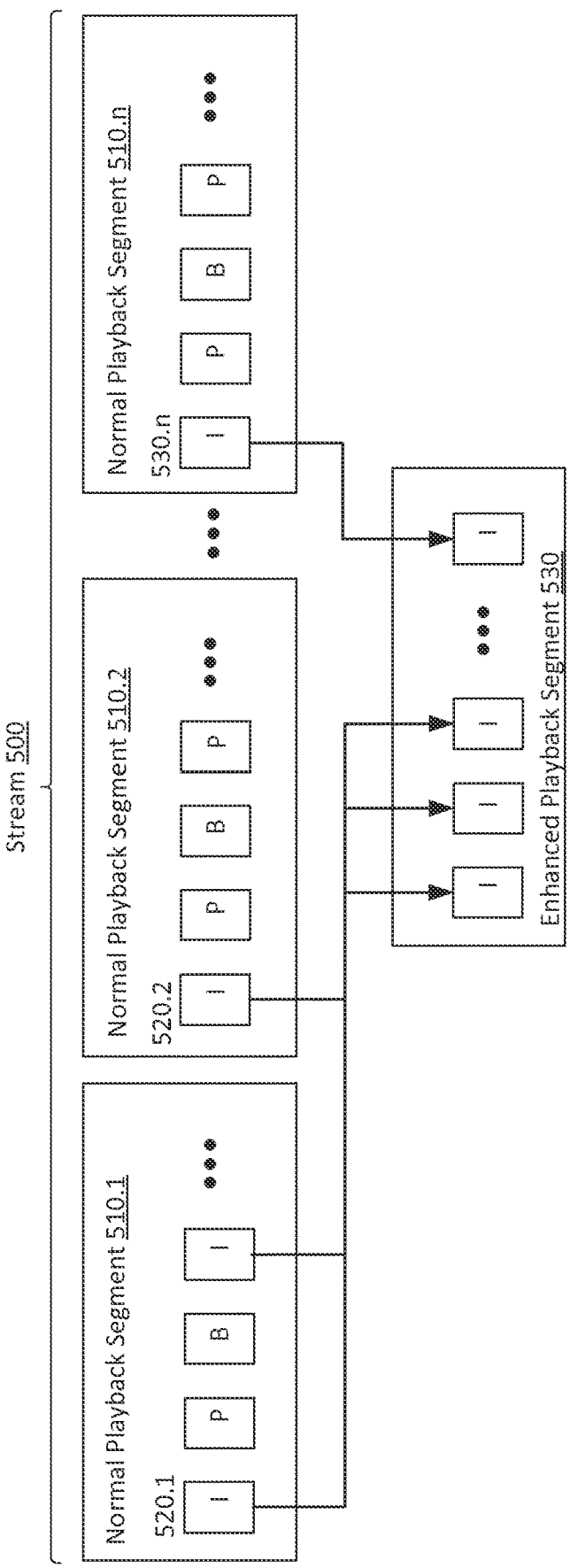
FIG. 5 illustrates the composition of an enhanced playback segment according to an example embodiment.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Systems and methods for enabling playback control functions of a media player are disclosed. For example, a user of a client device receiving a video stream may perform rewind and fast forward control functions. The client device may implement these playback control functions by retrieving a dedicated type of segment to support these functions. Using the packed I-frame segment, the media player may display frames selected at a predetermined interval while maintaining a visual cadence that is pleasing to a viewer. In addition, the use of a packed I-frame segment alleviates transmission problems associated with existing communication systems.

In the described embodiments, a client device may, during a normal playback mode, retrieve from a media source a plurality of transmission segments that contain coded video data of the media asset, the coded video data representing frames of asset content at a first temporal spacing, during an enhanced playback mode, retrieve from the media source at least one transmission segment that contains coded video data of the media asset, the coded video data representing frames of asset content at a second temporal spacing larger than the first, wherein all frames of the transmission segment are coded by intra-coding.

FIG. 1 is a simplified block diagram of an example media distribution system 100 suitable for use with the present invention.

The system 100 may include a distribution server 110 and a client device 120 connected via a communication network 130. The distribution server 110 may include a storage system 115 that may store a variety of media streams str1-str3 (e.g., music, movies, television shows, advertisements, etc.) for download by the client device 120. The distribution server 115 may transmit media streams str1-str3 to the client device 120 via the network 130 in response to client requests. For example, the streaming media may be pre-stored at distribution server 115, as media assets 117. In another example, "live streamed" data may be stored at distribution server 115 on a real-time basis.

One or more media assets 117 may be stored, within the storage system 115. Media assets 117 may be transmitted as a plurality of streams (e.g., str1-str3), each stream having a plurality of coded media segments (e.g., segments 1.1-1.$n$, 2.1-2.$n$, 3.1-3.$n$). Each media stream (e.g., str1) may be coded at a respective bitrate, frame rate, and/or frame size. In the illustrated embodiment, each of the plurality of segments 1.1-1.n, 2.1-2.n, 3.1-3.n may include media content of a predetermined duration (e.g., six seconds). In some instances, the distribution server 110 may store multiple copies of a particular media stream, especially video media streams. The example illustrated in FIG. 1 depicts three coded video streams str1-str3 that are coded at varying bitrates (e.g., 4 Mb/s, 2 Mb/s and 500 Kb/s).

In addition, each of the plurality of segments 1.1-1.n, 2.1-2.n, 3.1-3.n may contain frames coded by a predetermined protocol. For example, video data in each segment 1.1-1.n, 2.1-2.n, 3.1-3.n may be coded according to ITU-T H.265 (commonly "HEVC"), H.264, H.263 or other standard or proprietary protocols. Coded video data typically is coded according to predictive coding techniques that exploit spatial and/or temporal redundancy in a source video sequence. Accordingly, frames of a source video sequence may be coded according to intra-prediction techniques (I-coding) or inter-prediction techniques (often, P- and/or B-coding). I-coded frames may be decoded without reference to other frames in the coded video data but P-coded and B-coded frames cannot be decoded without reference to other frames. P- and B-coding often achieves lower bit rates for individual frames and, therefore, coded video data often has a higher percentage of P- and B-coded frames than I-coded frames. For convenience, these segments are called "normal playback segments" herein.

Embodiments of the present invention may provide, within a distribution server 110, a type of segment to support enhanced playback control functions, called enhanced transmission or "packed I-frame" segments, for convenience. An enhanced transmission segment may store I-coded frames of a media stream spaced at temporal intervals that correspond to the enhanced playback mode being supported. Thus, in an example where segments 1.1-1.n of a media stream str1 are coded at 30 frames per second with various distributions of I-, P- and B-coded frames, a packed I frame segment IS1 may support fast forward and rewind playback modes. In this example, packed I-frame segment IS1 consists of sampled I-frames originating from stream str1.

In some implementations, the normal playback segments, by convention, may include I-frames as the first coded frame in each segment and include other I-coded frames at regular intervals. For example, the distribution server 110 may operate according to a segmentation policy that requires two I-coded frames to appear in every segment and that those I-coded frames appear at regularly-spaced time intervals in display order.

Packed I-frame segments IS1-153 may be generated in a variety of ways. For example, I-frames may be copied from normal playback segments 1.1-1.n, 2.1-2.n, 3.1-3.n to the packed I-frame segments IS1-153, respectively. In this example, playback of I-frames is used to implement playback control functions. As a result, cache utilization inside communication network is improved and unpredictable latencies are reduced. In another example, normal playback segments 1.1-1.n, 2.1-2.n, 3.1-3.n may be re-encoded in order to produce I-frames more frequently. In this example, only frames being re-encoded as I-frames may be processed. By rendering I-frames at shorter intervals, playback control functions may be provided with a more pleasing cadence to the user. In addition, this approach avoids copying of I-frames from normal playback segments segment 1.1-1.n, 2.1-2.n, 3.1-3.n.

The distribution server 110 also may store a manifest file 116 that, for each media asset 117, provides configuration information for associated streams str1-str3 (e.g., bitrate, size, etc.) and, for each stream, identifies coded video segments and packed I-frame segments that correspond to the stream. The manifest file 116 may also correlate segments of coded video with corresponding segments having varying bitrates. Manifest file 116 may identify segments by a network location resource such as a URL.

The client device 120 may be any electronic device. The client device may include a media player adapted to download streaming media from the distribution server 110. The distribution server 110 may transmit media to the client device 120 via channel 140 and communication network 130. The client device 120 decodes the downloaded segments such that they may be rendered for playback.

Although the client device 120 is illustrated as a tablet computer in FIG. 1, client devices may be provided as a variety of computing platforms, including smartphones, personal computers, laptop computers, media players, other servers, and/or dedicated video conferencing equipment. The network 130 represents any number of networks that convey coded video data among the distribution server 110 and the client device 120, including, for example, wireline and/or wireless communication networks. A communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless discussed hereinbelow.

FIG. 1 illustrates a simplified implementation of media distribution system 100. The example architecture depicted in FIG. 1 may be expanded to accommodate multiple distribution servers, edge caches associated with the distributions servers, content servers, coding servers, client devices, communications networks, etc. In some implementations, it is permissible to provide some servers as dedicated media coding servers and other servers as dedicated media transmission servers.

FIG. 2 illustrates example media player application hosted on a client device according to an example embodiment.

The media player application 200 may include program instructions that are executable by the processor to provide a user interface and media stream control functions to a user of the client device. The media player application 200 may include a media playback component 201, configured to provide the user interface and associated functionality of the media player that enables the user to select and perform playback control functions of media streams. The media player application 200 may also include and a media input/output (I/O) component 202, configured to provide media stream requests to and receive media streams from the media distribution server 110.

FIG. 3 illustrates a simplified user interface 300 of a media player that implements media stream playback control functions according to an example embodiment.

The user interface 300 can include a video display portion 301 to display a video or other visual components of a media stream, and playback control buttons 302 to receive media stream playback control inputs from the user, including one or more of a normal speed forward playback control, a stop playback control, a pause playback control, a rewind playback control, and a fast forward playback control.

FIG. 4 illustrates a video stream 400 suitable for use with the present invention. As shown in FIG. 4, the example video stream 400 may be comprised of a plurality of normal playback segments 410.1-410.n. Each of these segments 410.1-410.n may further include a plurality of frames 420.1-

420.*n*. A variety of frame types are typically assembled to construct a segment, including I-frames (intra-coded), P-frames (predicted) and/or B-frames (bi-predictive).

During coding, a coding server (not shown) may assign to each frame a certain frame type, which can affect the coding techniques that are applied to the respective frame. For example, frames often are assigned as one of the following frame types. An I-frame generally operates as a standalone frame that is coded and decoded without using any other frame in the sequence as a source of prediction. As an I-Frame may contain information for rendering an entire image, an I-frame is typically larger than other frame types. By contrast, P-frames and B-frames generally include references to other frames. A P-frame is one that is coded and decoded using a single previously-coded frame in the sequence as a candidate source of prediction, and a B-frame is one that is coded and decoded using a pair of earlier-coded frames in the sequence as candidate sources of prediction.

The example media stream 400 may be utilized to perform a normal speed forward playback of video media. In addition, the example media stream 400 may also be utilized to perform playback control functions according to conventional techniques or according to embodiments of the present invention.

FIG. 5 illustrates the composition of an enhanced playback segment according to an example embodiment. As shown in FIG. 5, the example video stream 500 may be comprised of a plurality of segments 510.1-510.*n*. Each of these individual segments 510.1-510.*n* may further include a plurality of frames 520.1-520.*n* including I-, P-, and/or B-frames.

In addition, an enhanced playback segment 530 is composed of I-frames from normal playback segments 510.1-510.*n*. The enhanced playback segment 530 may be a standalone media segment that includes I-frames from normal playback segments 510.1-510.*n*. For example, an enhanced playback segment may be generated for a predetermined number of media segments. Alternatively, an enhanced playback segment may be generated to store a predetermined number of I-frames. In either example, multiple enhanced playback segments may be used to separately store I-frames of a stream 500.

Consider an example where, each of normal playback segments 510.1-510.*n* may include approximately 180 frames and include a few I-frames (e.g., 2 or 3) such that an I-frame is rendered every 2-4 seconds. As I-frames may be substantially larger than P-, and B-frames, each enhanced playback segment 530 may include fewer frames than normal playback segments 510.1-510.*n*. For example, an enhanced playback segment may include 45, 60, or 90 frames.

The use of an enhanced playback segment 530 may cause the rendering of an I-frame every half second to every eighth of a second or faster. For example, when implementing fast forward and rewind control functions at 16×, the rendering of eight I-frames per second produces a visual cadence that is pleasing to a viewer. In another example, when implementing fast forward and rewind control functions at 4×, two I-frames per second may be visually too fragmented for some viewers.

FIGS. 6A-6E illustrate various video frame display timelines during normal speed forward and other control playback modes of a media stream according to example embodiments.

Figure 6A:
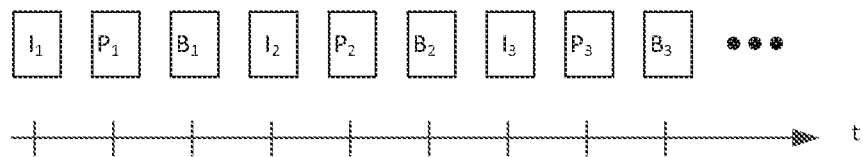
FIGS. 6A-6E illustrate various video frame display timelines during normal speed forward and other control playback modes of a media stream according to example embodiments.

FIG. 6A depicts an embodiment of a timeline of display of video frames by the media player program during a normal speed forward playback of a video component of a media stream that can be produced utilizing media segment files (e.g., 410.1-410.*n* or 510.1-510.*n*). In the depicted timeline, the normal speed playback includes displaying each frame I1, P1, B1, I2, P2, B2, I3, P3, B3, . . . of the video stream in order and at a predetermined rate of display. For example, each frame I1, P1, B1, I2, P2, B2, I3, P3, B3, . . . may be displayed for $\frac{1}{30}^{th}$ of a second during normal playback mode.

FIGS. 6B-6E depict embodiments of a timeline of display of video frames by the media player program during other control playback modes that can be produced by utilizing enhanced playback segments (e.g., 530). During other control playback modes, frames may still be displayed for $\frac{1}{30}^{th}$ of a second, but the interval between selected frames may be varied. For example, every I-frame or every $10^{th}$ I-frame may be displayed.

Figure 6B:
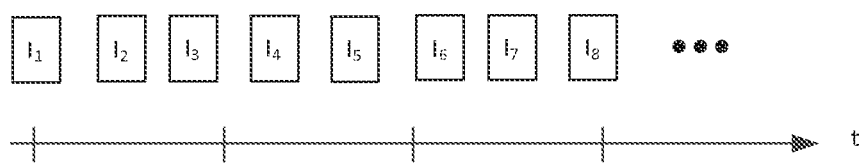
Figure 6C:
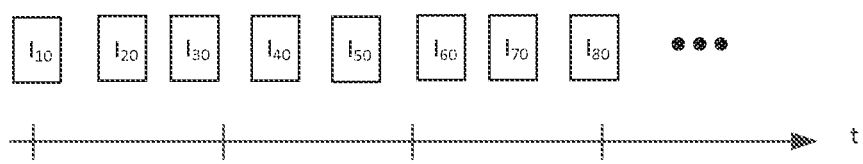
Figure 6D:
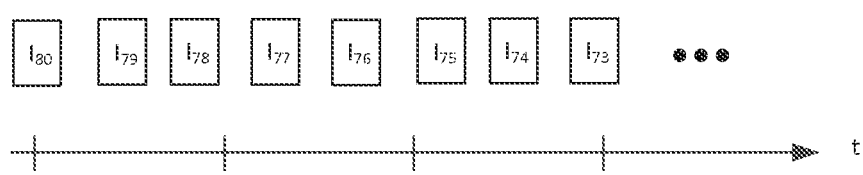
Figure 6E:
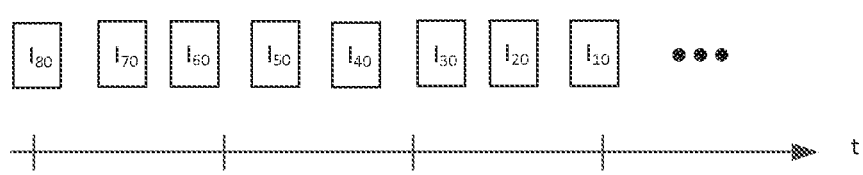

FIG. 6B depicts an embodiment of a relatively slower speed fast forward playback mode that includes displaying each I-frame I1, I2, I3, I4 . . . of the video in a forward order. FIG. 6C depicts an embodiment of a relatively higher speed fast forward playback mode that includes displaying a subset of I-frames I10, I20, I30, I40 . . . of the video in a forward order. In the example of FIG. 6C, every $10^{th}$ I-frame may be displayed. FIG. 6D depicts an embodiment of a relatively slower speed rewind playback mode that includes displaying only each I-frame I80, I79, I78, I77 . . . of the video stream in a reverse order. FIG. 6E depicts an embodiment of a relatively higher speed rewind playback mode that includes displaying a subset of the I-frames I80, I70, I60, I50 . . . of the video in a reverse order. In the example of FIG. 6E, every 10th I-frame may be displayed.

Using packed I-frames, the media streaming system can provide improved techniques for requesting video frames for control playback functions of a media player. The embodiments reduce or eliminate problems associated with conventional systems, such as delays associated variable or unpredictable transmission of numerous media segments in the communication network.

FIG. 7 illustrates a method 700 for implementing a playback control function according to an example embodiment.

At 701, a media asset may be rendered by a client device. Rendering generally includes buffering and decoding the coded segments of the media asset so that the resulting decoded segments may be rendered by a media player.

At 702, the client device may receive a user command indicating a playback control function, including one or more of a normal speed forward playback control, a stop playback control, a pause playback control, a rewind playback control, and a fast forward playback control.

Next, at 703, the media player determines whether the user-selected command includes one of a fast forward or rewind playback control. If so, the media player may request one or more packed I-frames that may be utilized to implement the user selected control command, at 704. Otherwise, the media player may request additional media segments if the user command denotes a normal speed forward playback control. Additional segments may not be needed if the user selects a stop or pause commands. Lastly, at 706, the media player implements the user-select control.

Figure 8:
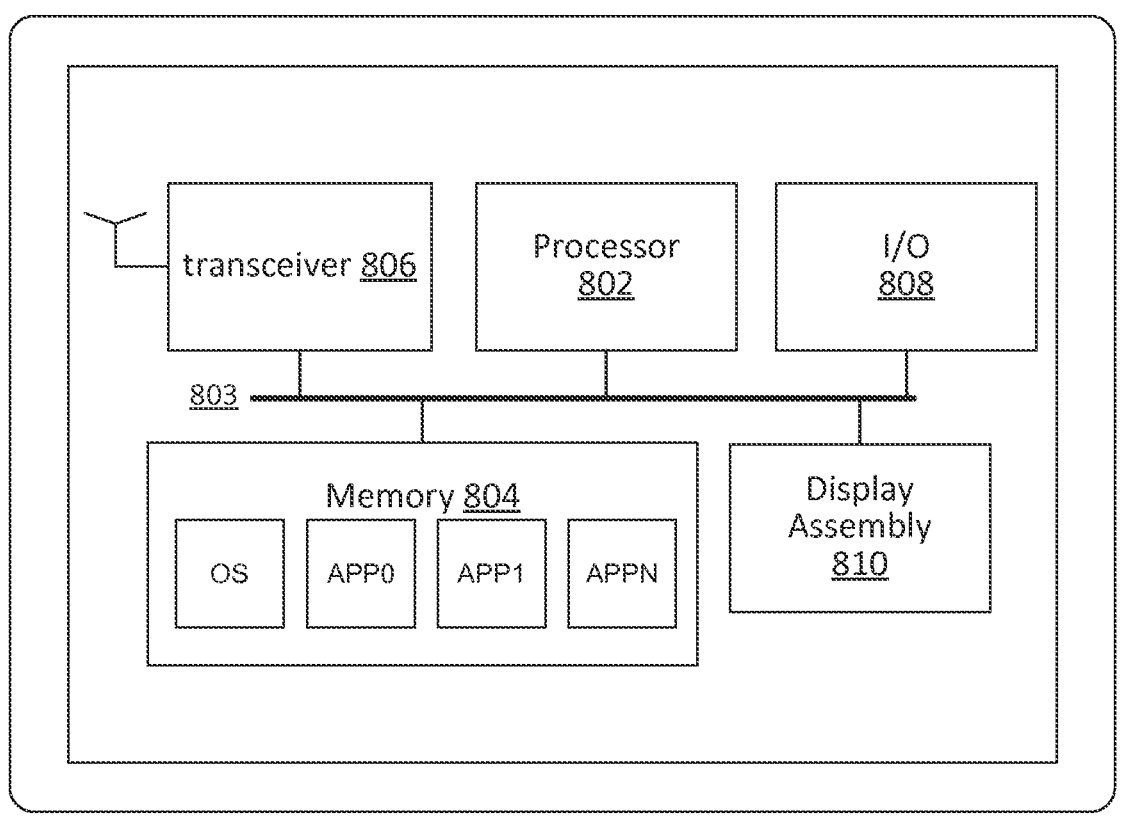
FIG. 8 illustrates a simplified schematic view of an example client device according to an example embodiment.

FIG. 8 is a simplified schematic view of a client device 800 according to an example embodiment.

Client device 800 may include a processing system and control circuitry 802, memory 804, communications circuitry 806, input/output components 808, and display assembly 810. The client device 800 may also include a bus 803 that may provide a data transfer path for transferring data and/or power, to, from, or between various other components of client device 800.

Processing system 802 may control the operation of components within client device 800. For example, processor 802 may receive input signals from an input component 808 and/or drive output signals to display assembly 810. In another example, processor 802 may execute instructions for one or more applications APP0-APPN, including media streaming applications, stored in memory 804.

Memory 804 stores the operating system OS of the client device 800 as well as one or more applications (APP0, APP1 . . . APPN). Included among the applications may be a streaming application service. Memory 804 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 804 may include cache memory, which may be one or more different types of memory used for temporarily storing data for electronic device applications. Memory 804 may store media streams (e.g., music, image, and video files), software, firmware, preference information (e.g., media playback preferences), wireless connection information, subscription information (e.g., information that tracks podcasts, television shows, or other media a user subscribes to), etc.

Communications circuitry 806 may be provided to enable the client device 800 to communicate with one or more other electronic devices or servers using any suitable communications protocol. For example, communications circuitry 806 may support Wi-Fi (e.g., an 802.11 protocol), Ethernet, Bluetooth, high frequency systems (e.g., 900 MHz, 2.4 GHz, and 5.6 GHz communication systems), infrared, transmission control protocol/internet protocol ("TCP/IP"), hypertext transfer protocol ("HTTP"), real-time transport protocol ("RTP"), real-time streaming protocol ("RTSP"), and other standardized or propriety communications protocols, or combinations thereof.

In some embodiments, one or more components of electronic device 800 may be combined or omitted. Moreover, electronic device 800 may include additional components not depicted in FIG. 8. Client device 800 may be any stationary or portable electronic device, including tablet computers, smartphones, laptop computers, personal computers, set-top boxes, wearable electronic devices, and other consumer electronic products designed to decode and render coded media streams.

Electronic device 800 may also include one or more output components 808 that may render information (e.g., audio and video) to a user of device 800. An output component of client device 800 may take various forms, including, but not limited, to audio speakers, headphones, visual displays via display assembly 810, etc.

Display assembly 810 may include any suitable type of display or interface for presenting visible information to a user of client device 800. In some embodiments, display assembly 810 may include an embedded or coupled display. Display assembly 810 may include, for example, a touch screen, a liquid crystal display ("LCD"), a light emitting diode ("LED") display, an organic light-emitting diode ("OLED") display, or any other suitable type of display.

The foregoing discussion has described operation of the embodiments of the present invention in the context of distribution servers, client devices, content servers, and coding servers. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like. And, of course, these components may be provided as hybrid systems that distribute functionality across dedicated hardware components and programmed general purpose processors as desired.

It will be apparent to those skilled in the art that various modifications and variations can be made in the system and method for item to item transitions of the present invention without departing form the spirit or scope of the invention. Thus, it is intended that the present invention cover the modifications and variations of this invention provided they come within the scope of the appended claims and their equivalents.

We claim:

1. A method of streaming a media asset at a media player, comprising:
    storing, at a media source, first segments of a first media stream for the media asset, the first segments containing video data of frames of the media asset coded according to temporal prediction techniques;
    storing, at the media source, second segments of a second media stream for the media asset that contain frames of the media asset coded solely as intra-coded (I) frames, wherein the second segments contains frames of the media asset that are redundant to corresponding frames of the first segments and wherein at least one I frame in the second segments corresponds a frame in the first segments that is not an I frame;
    storing, at the media source, manifest data that contains for the first media stream:
        an identifier of a network location from which each of the first segments may be downloaded,
        configuration information for the first media stream including a bitrate of the stream,
        an identifier of a network location from which each of the second segments may be downloaded, and
        an indication that both the first segments and the second segments are associated with the first media stream, that the first segments are normal playback segments, and the that second segments are enhanced playback segments; and
    providing, by the media source, data from the first segments and the second segments in response to request(s) from a client device.

2. The method of claim 1, wherein the media asset is live streamed content.

3. The method of claim 1, wherein the media asset includes:
    a plurality of media streams, each associated with its own bandwidth, and
    a plurality of sets of second segments, each associated with a respective media stream.

4. The method of claim 1, wherein the manifest data correlates segments of the first and second media streams with corresponding segments having varying bitrates.

5. The method of claim 1, wherein the manifest data identifies first segments as normal playback type segments and second segments as enhanced playback type segments.

6. The method of claim 1, wherein the frames of the second segments are redundant to a cadence of frames spaced at a predetermined interval of the first segments.

7. The method of claim 1, further comprising:
re-encoding frames of the first media stream segments to create the I-frames of the second media stream segments, wherein the frames selected from the first media stream segments for inclusion in the second media stream segments are spaced at a cadence shorter than intervals between I-frames in the first media stream segments.

8. The method of claim 1, wherein the at least one I frame in the second segments is re-encoded from the corresponding frame in the first segments that is not an I frame.

9. The method of claim 1, wherein the cadence of first media stream corresponding to second media stream frames is shorter that the cadence of I frames in the first media stream.

10. The method of claim 1, wherein the frames of the second media stream are in reverse order of their corresponding frames of the first media stream.

11. A non-transitory computer readable medium having instructions for storing a media stream, the instructions when executed by at least one processing system, cause the at least one processing system to:
store, at a media source, first segments of a first media stream, the first segments containing video data of frames of a media asset coded according to temporal prediction techniques;
store, at the media source, second segments that contain frames of the media asset coded solely as intra-coded (I) frames, wherein the second segments contains frames of the media asset that are redundant to frames of the first segments and wherein at least one I frame in the second segments corresponds a frame in the first segments that is not an I frame;
storing, at the media source, manifest data that contains for the first media stream:
an identifier of a network location from which each of the first segments may be downloaded,
configuration information for the first media stream including a bitrate of the stream, and
an identifier of a network location from which each of the second segments may be downloaded, and
an indication that both the first segments and the second segments are associated with the first media stream, that the first segments are normal playback segments, and the that second segments are enhanced playback segments; and
providing, by the media source, data from the first segments and the second segments in response to request(s) from a client device.

12. The non-transitory computer readable medium of claim 11, wherein the media asset is live streamed content.

13. The non-transitory computer readable medium of claim 11, wherein the media asset includes:
a plurality of media streams, each associated with its own bandwidth, and
a plurality of sets of second segments, each associated with a respective media stream.

14. The non-transitory computer readable medium of claim 11, wherein the manifest data correlates segments of the first and second media streams with corresponding segments having varying bitrates.

15. A distribution server comprising:
a processing system;
memory storing one or more programs for execution by the processing system, the one or more programs including instructions for:
storing first segments of a first media stream, the first segments containing video data of frames of a media asset coded according to temporal prediction techniques;
storing second segments that contain frames of the media asset coded solely as intra-coded (I) frames, wherein the second segments contains frames of the media asset that are redundant to frames of the first segments and wherein at least one I frame in the second segments corresponds a frame in the first segments that is not an I frame;
storing, at the media source, manifest data that contains for the first media stream:
an identifier of a network location from which each of the first segments may be downloaded,
configuration information for the first media stream including a bitrate of the stream, and
an identifier of a network location from which each of the second segments may be downloaded, and
an indication that both the first segments and the second segments are associated with the first media stream, that the first segments are normal playback segments, and the that second segments are enhanced playback segments; and
providing, by the media source, data from the first segments and the second segments in response to request(s) from a client device.

16. The distribution server of claim 15, wherein the media asset is live streamed content.

17. The distribution server of claim 15, wherein the media asset includes:
a plurality of media streams, each associated with its own bandwidth, and
a plurality of sets of second segments, each associated with a respective media stream.

18. The distribution server of claim 15, wherein the manifest data correlates segments of the first and second media streams with corresponding segments having varying bitrates.

19. A method of rendering a media asset at a media player, comprising:
receiving, at the media player, a manifest file of the media asset, the manifest file containing information identifying:
at least one coded representation of the media asset comprised of a plurality of first transmission segments, each first transmission segment containing coded video data of the media asset at a first temporal spacing, the manifest file identifying media source resource addresses respectively of the first transmission segments, and
a packed I-frame representation of the media asset comprised of a plurality of second transmission segments, each second transmission segment containing coded video data of the media asset at a second temporal spacing greater than the first temporal spacing, wherein all frames of the second transmission segments are redundant to corresponding frames of the first transmission segments and are coded by intra-coding, at least one I frame in the second segments corresponds a frame in the first segments that is not an I frame, and the manifest file identifying media source resource addresses respectively of the second transmission segments;
during a normal playback mode:
  selecting, from the manifest file, first transmission segment(s) that contain coded video data of the media asset to be rendered according to the normal playback mode; and
  issuing retrieval requests to the media source at the resource address(es) of the selected first transmission segment(s);
during an enhanced playback mode:
  selecting, from the manifest file, second transmission segment(s) that contain coded video data of the media asset to be rendered according to the enhanced playback mode,
  issuing retrieval requests to the media source at the resource address(es) of the selected second transmission segment(s);
extracting intra-coded frames from retrieved second transmission segment(s) based on a playback speed of the enhanced playback mode;
decoding, at the media player, the coded video data of the selected intra-coded frames; and
rendering the decoded video data on a display of the media player.

\* \* \* \* \*